US008376193B2

(12) United States Patent
Veltrop et al.

(10) Patent No.: US 8,376,193 B2
(45) Date of Patent: Feb. 19, 2013

(54) RODLESS DISPENSER

(75) Inventors: Loren Veltrop, Chicago, IL (US); Eric Schmidt, Forest Park, IL (US); Scott Rote, New Lenox, IL (US); Daniel Somen, Chicago, IL (US); Donald Van Erden, Grayslake, IL (US)

(73) Assignee: Prince Castle, LLC, Carol Stream, IL (US)

(*) Notice: Subject to any disclaimer, the term of this patent is extended or adjusted under 35 U.S.C. 154(b) by 335 days.

(21) Appl. No.: 12/684,597

(22) Filed: Jan. 8, 2010

(65) Prior Publication Data

US 2011/0168741 A1 Jul. 14, 2011

(51) Int. Cl.
*B67D 7/60* (2010.01)
*G01F 11/00* (2006.01)

(52) U.S. Cl. ........................................ 222/392; 222/391

(58) Field of Classification Search .................. 222/391, 222/392, 386; 74/594.1–594.4; 192/41 R, 192/12 B See application file for complete search history.

(56) References Cited

U.S. PATENT DOCUMENTS 1,591,693 A 7/1926 Atz
2,045,261 A 6/1936 Chute
3,031,066 A 4/1962 Leach
3,051,264 A 8/1962 Batchelor
3,782,598 A 1/1974 Basa
3,831,455 A 8/1974 Patrignani
3,976,166 A 8/1976 Charpentier
4,154,153 A 5/1979 Stickle
4,318,499 A * 3/1982 Hamilton ...................... 222/327
4,984,952 A 1/1991 Reuter
5,064,098 A * 11/1991 Hutter et al. .................. 222/137
5,295,614 A * 3/1994 Chang ........................... 222/137
5,323,931 A 6/1994 Robards, Jr. et al.
5,479,460 A 12/1995 Wrobel
5,979,538 A 11/1999 Braun et al.
6,109,424 A 8/2000 Doan
6,148,925 A 11/2000 Moore
6,224,037 B1 5/2001 Novick
6,260,737 B1 7/2001 Gruendeman
6,321,945 B1 11/2001 Girouard et al.
6,354,793 B1 3/2002 Gammerler et al.
6,382,466 B1 5/2002 Schneider et al.
6,386,401 B1 5/2002 Dodd et al.

(Continued)

FOREIGN PATENT DOCUMENTS

DE 3513880 A1 10/1986
DE 4216541 A1 * 11/1993

(Continued)

OTHER PUBLICATIONS

DE 4216541 A1 Translation (Abstract and Description).*

(Continued)

*Primary Examiner* — Paul R Durand
*Assistant Examiner* — Vishal Pancholi
(74) *Attorney, Agent, or Firm* — Kelly & Krause LP; Joseph P. Krause, Sr.

(57) ABSTRACT

A push chain is used to drive a piston into a canister of extrudable material. The push chain is stored in an elongated chain magazine, withdrawn from the magazine and into the canister by actuation of a trigger connected to a sprocket for the chain. The push chain obviates the need for an elongated piston rod used in conventional extrudable material dispensers.

23 Claims, 7 Drawing Sheets

U.S. PATENT DOCUMENTS

| | | | | |
|---|---|---|---|---|
| 6,413,185 | B1 | 7/2002 | Baginski et al. | |
| 6,427,823 | B1 | 8/2002 | Ishikawa et al. | |
| 6,543,311 | B1 | 4/2003 | Baginski et al. | |
| 6,702,094 | B2 | 3/2004 | Ishikawa et al. | |
| RE38,555 | E | 7/2004 | Braun et al. | |
| 6,981,621 | B2 * | 1/2006 | Brandeis et al. | 222/392 |
| 7,270,619 | B2 | 9/2007 | Bourc'His | |
| 2002/0056538 | A1 | 5/2002 | Shaffer | |
| 2003/0205356 | A1 | 11/2003 | Braun et al. | |
| 2004/0173408 | A1 | 9/2004 | Szymanski et al. | |
| 2004/0177934 | A1 | 9/2004 | Olmsted | |
| 2005/0145653 | A1 * | 7/2005 | Brandeis et al. | 222/391 |
| 2005/0242228 | A1 | 11/2005 | Wagner et al. | |
| 2006/0163007 | A1 | 7/2006 | Bukowski et al. | |
| 2008/0083167 | A1 | 4/2008 | Olmsted et al. | |
| 2008/0264971 | A1 | 10/2008 | Harre et al. | |
| 2009/0008615 | A1 | 1/2009 | Young et al. | |
| 2009/0019724 | A1 | 1/2009 | Wagner et al. | |
| 2009/0159613 | A1 | 6/2009 | Rusch | |
| 2009/0224006 | A1 * | 9/2009 | Post et al. | 222/333 |

FOREIGN PATENT DOCUMENTS

| | | | |
|---|---|---|---|
| EP | 0403576 | B1 | 12/1990 |
| EP | 8762000031 | | 11/1998 |
| EP | 0936378 | A1 | 8/1999 |
| EP | 0969226 | B1 | 1/2000 |
| EP | 9692000026 | | 1/2000 |
| EP | 0994231 | B1 | 4/2000 |
| EP | 9942000031 | | 4/2000 |
| EP | 1591000402 | | 11/2005 |
| GB | 4624000022 | | 3/1937 |
| GB | 2076473 | A * | 12/1981 |
| JP | 2001254796 | A | 9/2001 |
| JP | 2003314630 | A | 11/2003 |
| JP | 2004108473 | A | 4/2004 |
| JP | 2005282745 | A | 10/2005 |
| JP | 2005337346 | A | 12/2005 |
| JP | 2007289856 | | 8/2007 |
| JP | 2007-289856 | | 11/2007 |
| WO | WO 8911602 | | 11/1989 |
| WO | WO 2006005942 | | 1/2006 |
| WO | WO 2007122129 | | 11/2007 |

OTHER PUBLICATIONS

European Search Report—Application No. EP 11 15 2687.

State of Intellectual Property Office of the People's Republic of China the First Office Action Issue date Jun. 25, 2012; Application No. 20111003407.X; Issue No. 2012061901025260; Applicant: Prince Castle LLC; Title: Rodless Dispenser for Extrudable Materials and Having a Contents Indicator.

USPTO, Office Action communication dated Oct. 9, 2012, U.S. Appl. No. 12/703,613.

* cited by examiner

RODLESS DISPENSER

BACKGROUND

Mechanical dispensers for viscous or extrudable materials include common, piston-type caulking guns found in any hardware store as well as small, hand-held devices for rolling up a flexible tube, such as the tubes that dispense toothpaste. Most extrudable material dispensers employ a piston attached to one end of an elongated piston rod. The piston is advanced through a partial-cylinder the shape of which is reminiscent of a trough and which is hereafter referred to as a holding cylinder or simply cylinder, the function of which is to hold a cylindrical canister of extrudable material.

Extrudable material in a canister is forced from the canister through a canister tip by driving a canister-internal piston installed into the "bottom" of the canister. The piston in the bottom of canister is hereafter referred to as a canister piston.

The canister piston drives extrudable material from the canister when the canister piston is driven through the canister by the piston attached to the piston rod. The piston rod is driven by a pistol grip mechanism that forms part of the dispenser. The pistol grip mechanism can be attached to either a ratcheting or ratchetless transmission device. Actuation of the pistol grip causes the piston rod to be advanced into the cylinder, which in turn drives the first piston (attached to the connecting rod) into the second piston (in the bottom of a canister of extrudable material) forcing extrudable material from the dispensing tube. As the first piston moves away from the transmission device and into the dispensing tube, extrudable material is forced from the tip of the canister.

FIG. 1 displays a side view of a typical prior art extrudable material dispenser described above. The first piston 21 in the cylinder is urged against the canister piston in the tube of extrudable material by operating the trigger 16, which is rotatably mounted in the handle 14. Grooves or teeth 17, formed in the elongated push rod 19 are engaged by a ratchet mechanism inside the handle 14 and not shown. The ratchet mechanism can be considered to be a "transmission" that converts the force applied to the trigger 16 into lateral displacement of the piston rod and first piston 21.

A problem with prior art caulking guns or other dispensers for extrudable materials is that the push rod 19 extends outwardly from the handle 14, which makes the dispenser unwieldy. The extended rod also makes the device difficult to store or set down between uses, especially when such devices are used in close quarters, as often happens when the devices are used in restaurants to dispense condiments and other extrudable food products.

A dispenser for dispensing extrudable material which eliminates the push rod 19 would be an improvement over the prior art.

DETAILED DESCRIPTION

Figure 1:
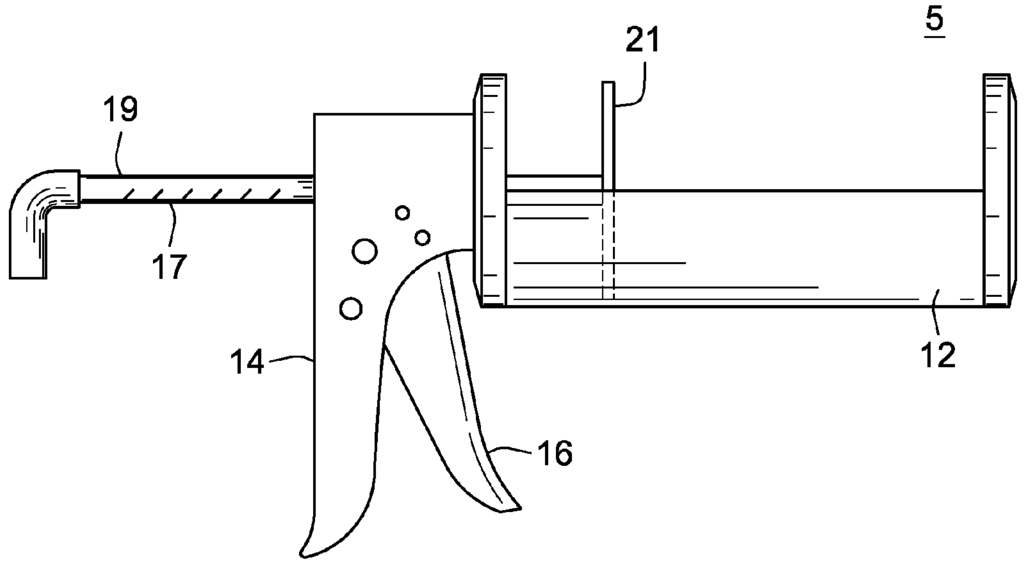
FIG. 1 (PRIOR ART)
FIG. 1 is a side view of a prior art extrudable material dispenser.
Figure 2:
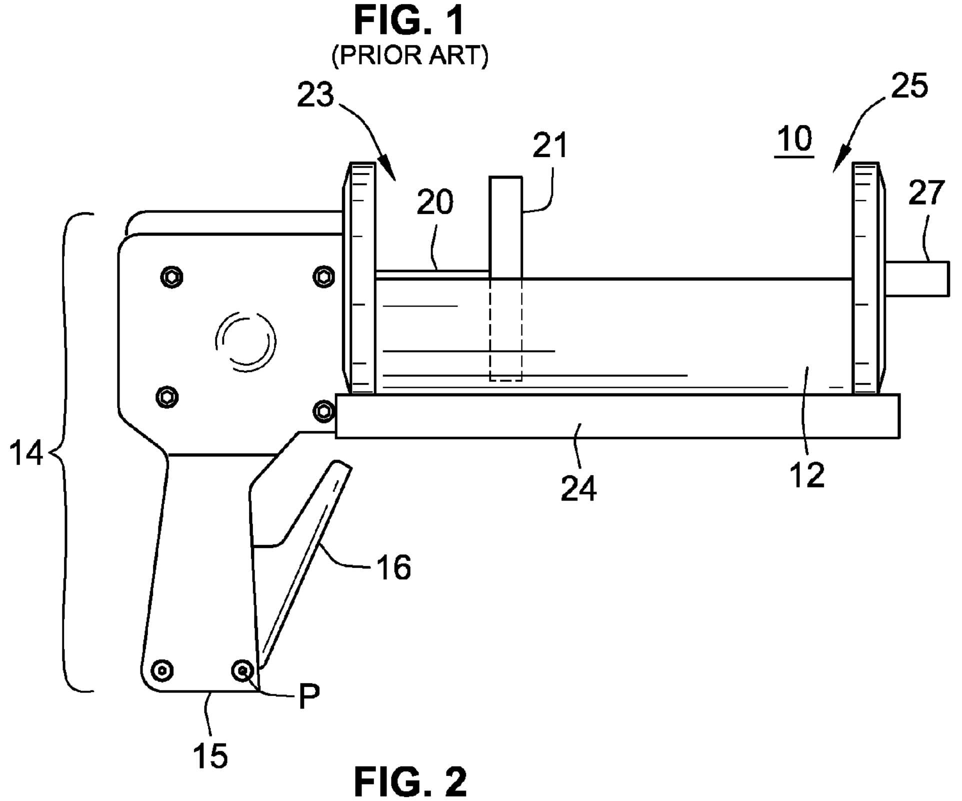
FIG. 2 is a side view of a rodless dispenser for extrudable materials.

FIG. 2 is a side view of a rodless dispenser 10 for dispensing extrudable materials by hand. The dispenser 10 is comprised of a cylinder 12, formed without a top "half" in order to allow tubes or canisters of extrudable materials to be inserted into and removed from the dispenser 10. The "half-cylinder" 12 for holding tubes or canisters is nevertheless referred to herein as a cylinder.

A housing, which acts as a handle 14, is attached to, or integrally formed as part of the cylinder 12. A lower or bottom end of a reciprocating trigger 16 is pivotally attached to the lower or bottom end 15 of the handle 14 at a pivot point P. When the trigger 16 is squeezed, it slides into the handle 14 where a trigger return spring, not visible in FIG. 2, is compressed when the trigger 16 is squeezed. Tension in the trigger return spring causes the trigger 16 to return to its starting position (exit from the handle 14) when a user releases the trigger 16. The trigger 16 can thus be cyclically squeezed and released.

Squeezing the trigger 16, drives a chain sprocket within the handle 14 on a bearing supported by the handle. A push chain, which is wrapped part way around the sprocket, is used to exert a force against a piston 26 in the cylinder 12 when the sprocket is rotated by the trigger 16. Force exerted by the piston 26 in the cylinder 12 through the push chain 24 drives extrudable material 23 out of a tube or canister 21. Cyclically actuating the trigger 16 thus dispenses extrudable material 23 using a push chain, instead of an elongated push rod, such as the ones used in prior art dispensers.

Push chains are well known. A push chain is a chain that can be looped or folded for storage but which becomes rigid when subjected to a compressive or thrust load. Push chains can also be used to exert a tensile force. Push chains can thus be used to push as well as pull. In the figures, the push chain is stored in a magazine adjacent the cylinder 12, looped part way around a driven sprocket and connected to the back side of a piston in the cylinder 12.

Figure 3A:
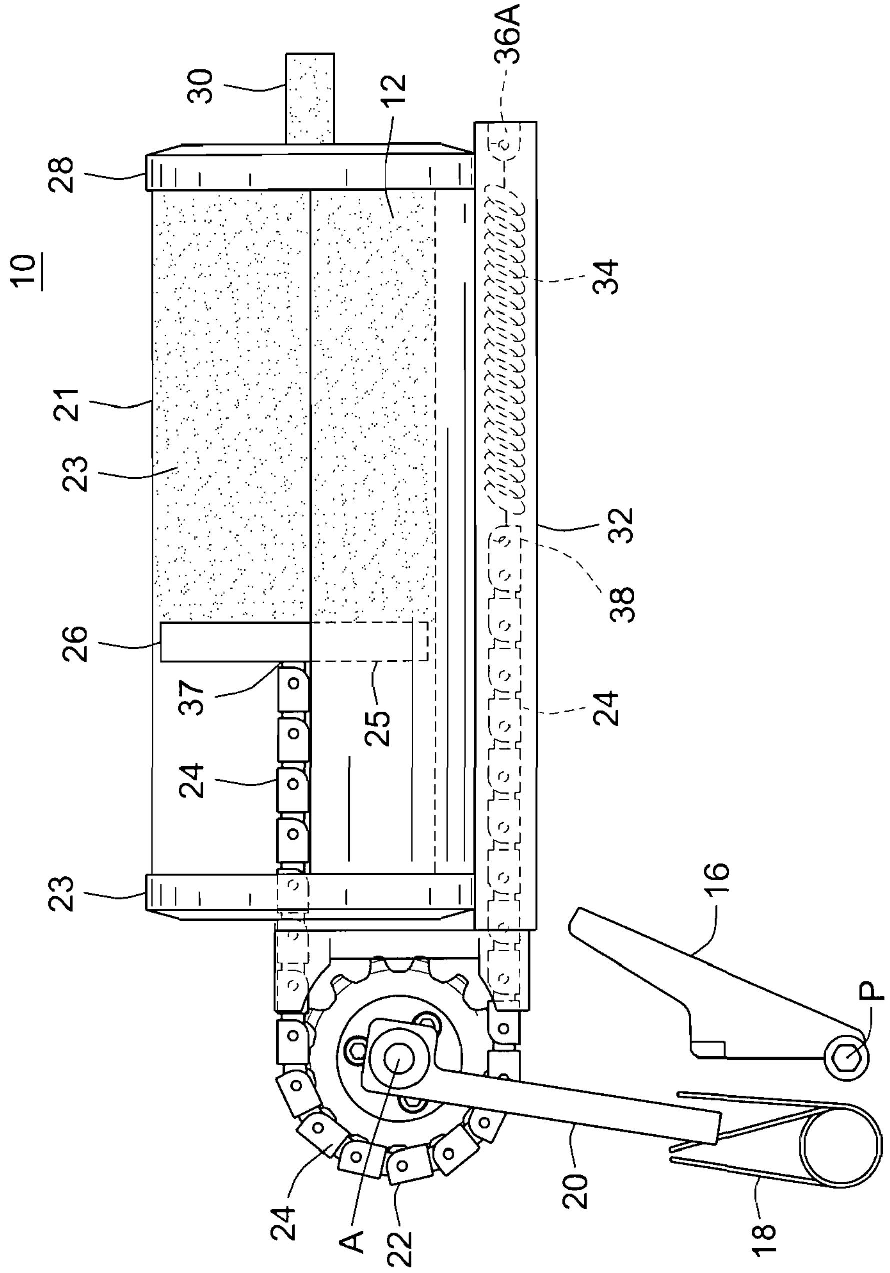
FIG. 3A is a right-side cutaway of the dispenser shown in FIG. 2.

FIG. 3A is a cross-sectional view of the dispenser shown in FIG. 2, as viewed from the right side of the dispenser 10. Squeezing the trigger 16 to force it into the handle 14 causes the trigger 16 to pivot counterclockwise (as shown in FIG. 3) around pivot point P. In so doing, the trigger 16 compresses a trigger return spring 18 and urges a swing arm 20 clockwise around P. The swing arm 20 is attached to the sprocket 22. Rotating the swing arm 20 clockwise around P causes the swing arm 20 to rotate clockwise around the axis A of a sprocket 22.

Figure 7:
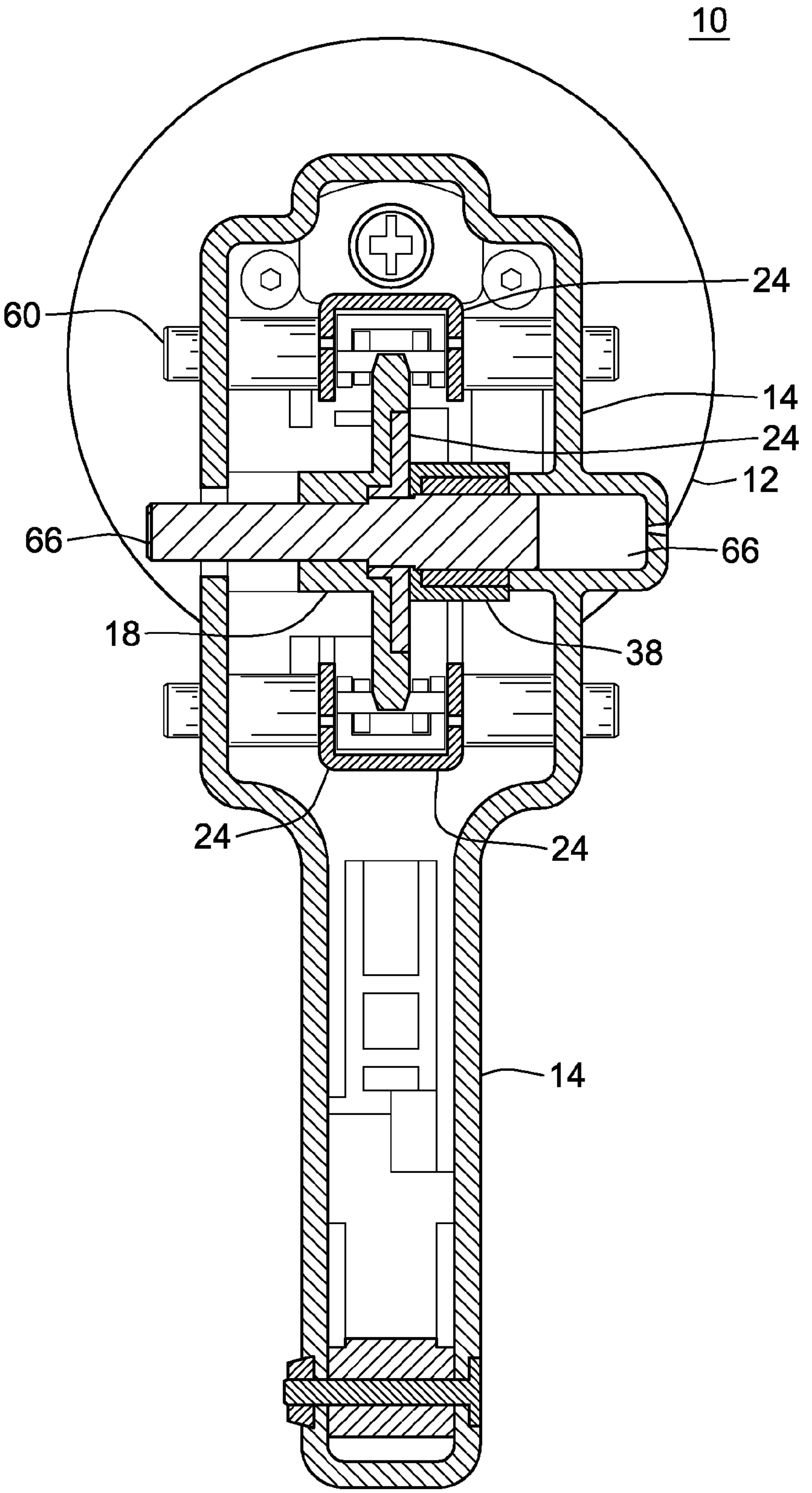
FIG. 7 is an end view of the device shown in FIG. 2.

The swing arm 20 is rotatably attached to the sprocket 22 via a one-way bearing, visible in FIG. 7 but not visible in FIG. 3. The one-way bearing is mounted in the handle 14 such that rotation of the swing arm 20 around the sprocket's axis A in a clockwise direction drives the sprocket 22 clockwise, however a releasable ratchet mechanism shown in FIG. 4 prevents the sprocket from rotating counterclockwise, at least until the ratchet mechanism is disengaged from the sprocket 22. When the sprocket 22 is "held in place" by the ratchet mechanism, the one-way bearing permits the swing arm 20 to return to its starting position, as shown in FIG. 3. Once the swing arm 20 returns to its starting location, the trigger 16 can be actuated again, i.e., rotated counterclockwise around P to engage the swing arm 20. Repeated cycling of the trigger 16 thus drives the sprocket 22 incrementally clockwise. The one-way bearing and ratchet mechanism thus enable the sprocket 22 to advance clockwise incrementally but prevent the sprocket 22 from rotating counterclockwise, until the ratchet is released or disengaged from the sprocket 22. Advancing the push chain 24 into the cylinder 12 by rotating the sprocket 22 clockwise with each trigger actuation causes the piston 26 to move incrementally from the proximal end 23 of the cylinder 12 toward the distal end 28, forcing extrudable material 23 out of the tube or canister 21 along the way. Releasing the trigger 16, however, does not reverse the sprocket 22 or pull the push chain 24 out of the cylinder 12.

Still referring to FIG. 3A, the push chain 24 has a first end 37 attached to the center of the back side 25 of the piston 26. The push chain 24 also has a second end 38 inside a chain magazine 32 and attached to a push chain return spring 34.

A "center or middle section of the push chain 24 is wrapped approximately half-way around the chain sprocket 22. A first portion of the chain 24, which is located between the sprocket 22 and first end 37 of the chain 24, extends from the teeth of the sprocket 22 part way into the cylinder 12 to where the first end 37 of the chain is attached to the back side 25 of the piston 26. A second portion of the push chain 24, which is located between the sprocket 22 and second end 38 of the chain 24, extends from the sprocket 22 into a chain magazine 24 that is located immediately below, adjacent to, and parallel to, the cylinder 12. Each actuation of the trigger 16 thus pulls a length of push chain 24 from the magazine 24, stretching the push-chain return spring 34 and pushes the same amount of chain into the cylinder 12.

A coil-type push chain return spring 34 is tethered to the second end 38 of the spring 24 and the distal end 36 of the magazine 24. The return spring 34 maintains the second part of the push chain 24 in tension as the chain 24 is driven down the cylinder 12 and acts to pull the chain 24 out of the cylinder 12 and back into the magazine 24 when the aforementioned ratchet mechanism is released.

Figure 3B:
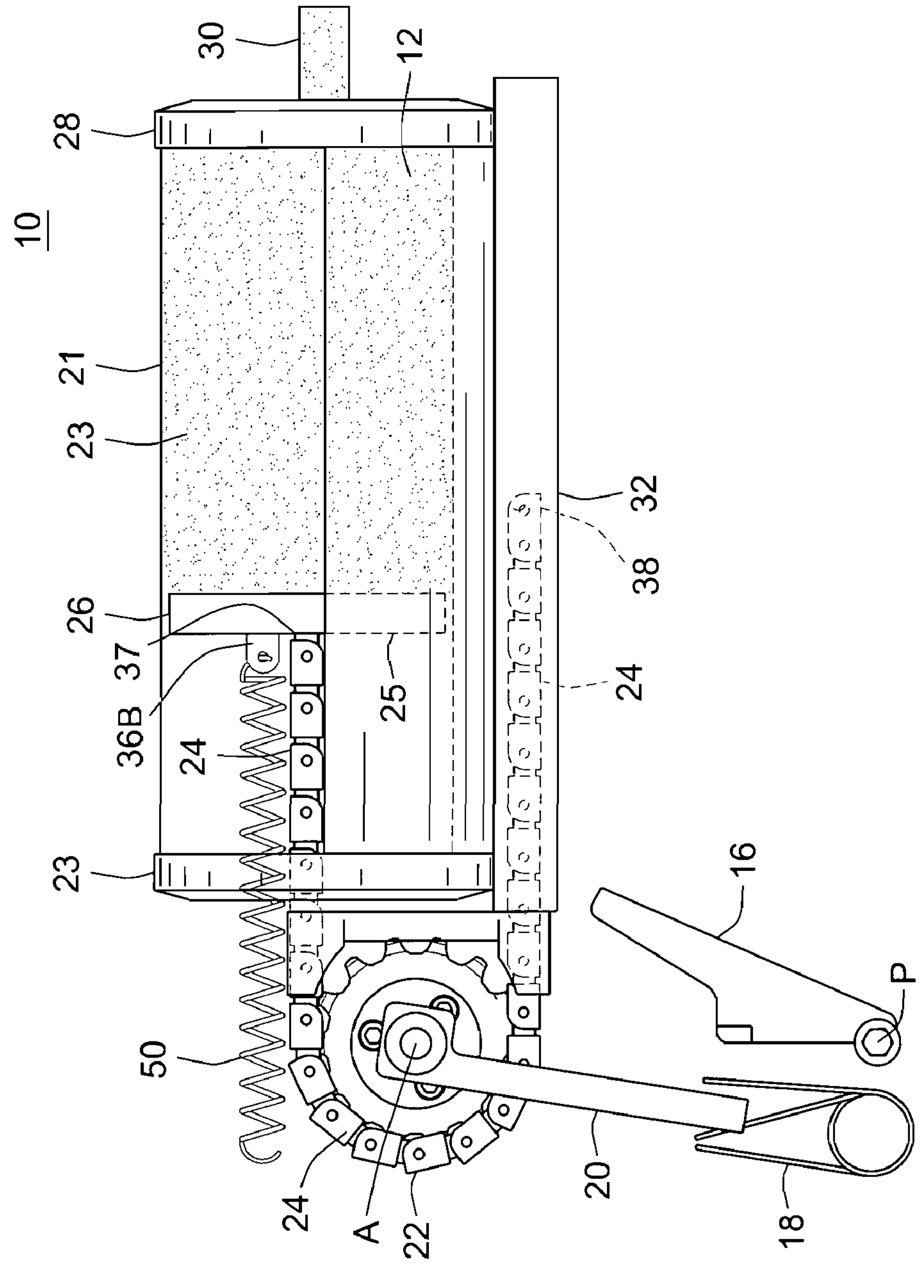
FIG. 3B is a right-side cutaway of an alternate embodiment of the dispenser shown in FIG. 2.

FIG. 3B is a cross-sectional view of an alternate embodiment of the dispenser shown in FIG. 2, as viewed from the right side of the dispenser 10. Unlike the embodiment shown in FIG. 3A which uses a push chain return spring 34 in the magazine 32, the embodiment shown in FIG. 3B uses a push chain return spring 50 located inside the handle 14. In yet another alternate embodiment, not shown, both return springs 34 and 50 can be used.

In FIG. 3B, the left end of the return spring 50 (as viewed in FIG. 3B) is attached to a post located inside the handle, which is not shown in FIG. 3B. The right end of the chain 24 (as viewed in FIG. 3B) is attached to an anchor 36B on the back side 25 of the piston 26. Rotating the sprocket 22 clockwise causes the push chain 24 to drive the piston 26 down the cylinder 12 toward the distal end 28 of the cylinder 12. As the piston 26 moves toward the distal end 28 of the cylinder 12, the return spring 50 is stretched, which exerts a compressive force on the first part of the chain, i.e., the portion between the sprocket 22 and the piston. Releasing the ratchet mechanism on the sprocket 22 enables the return spring 50 to pull the piston 26 and chain 24 back toward the sprocket 22, which drives the second end 38 of the chain 24 back into the magazine 32.

Figure 4:
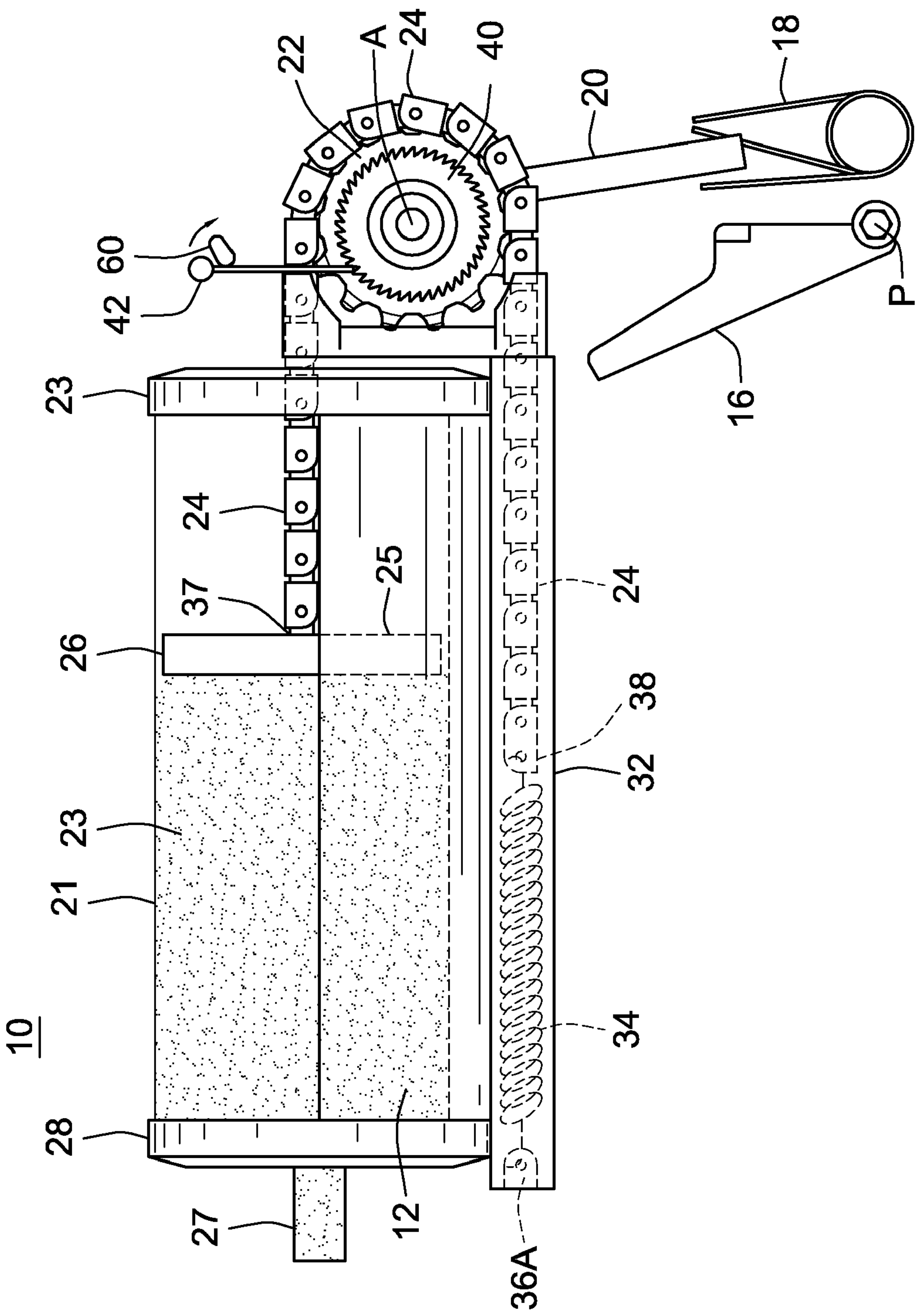
FIG. 4 is a left-side cutaway of the dispenser shown in FIG. 2.

FIG. 4 is a cut away view of the left side of the dispenser 10 shown in FIG. 2 and FIG. 3B. FIG. 4 shows among other things, a ratchet mechanism that allows the push chain 20 and hence the piston 21 to move in only one direction, i.e., toward the distal end 25 of the cylinder 12, until the ratchet mechanism is disengaged. The ratchet mechanism is comprised of the fine-toothed gear 40 attached to the chain sprocket 22 and a spring-loaded locking pawl 42. A bottom end 44 of the locking pawl 42 rides over or "follows" teeth in the gear 40. The gear 40 and sprocket 22 are attached to each other. They rotate together, in the same direction, on the aforementioned unidirectional or one-way bearing, which is also not visible in FIG. 4.

Figure 5C:
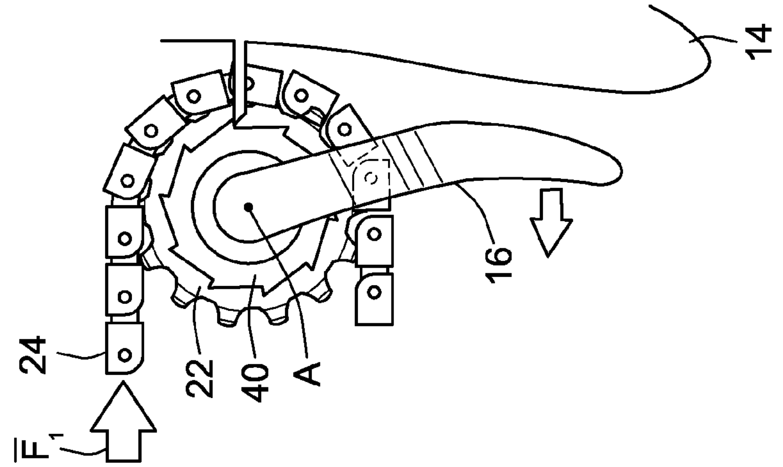
FIG. 5A, 5B, 5C are isolated views of the trigger, sprocket and ratchet mechanism and push chain used in the device shown in FIG. 2.
Figure 5B:
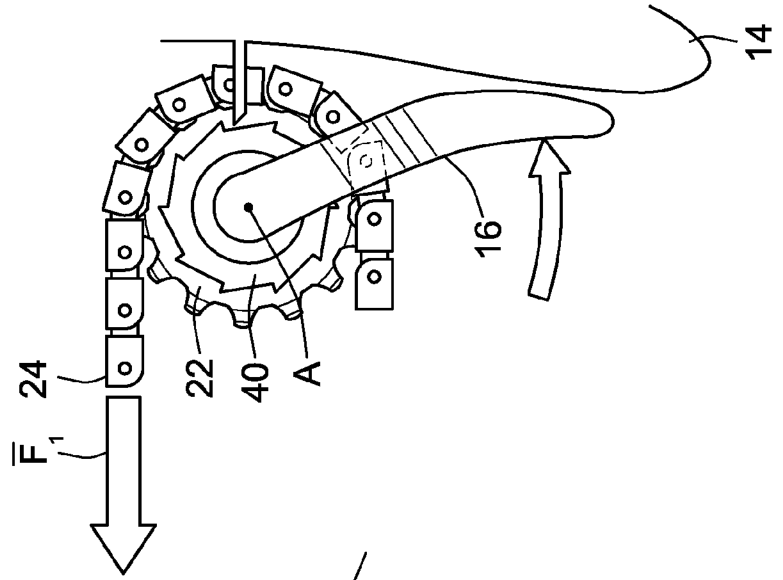
Figure 5A:
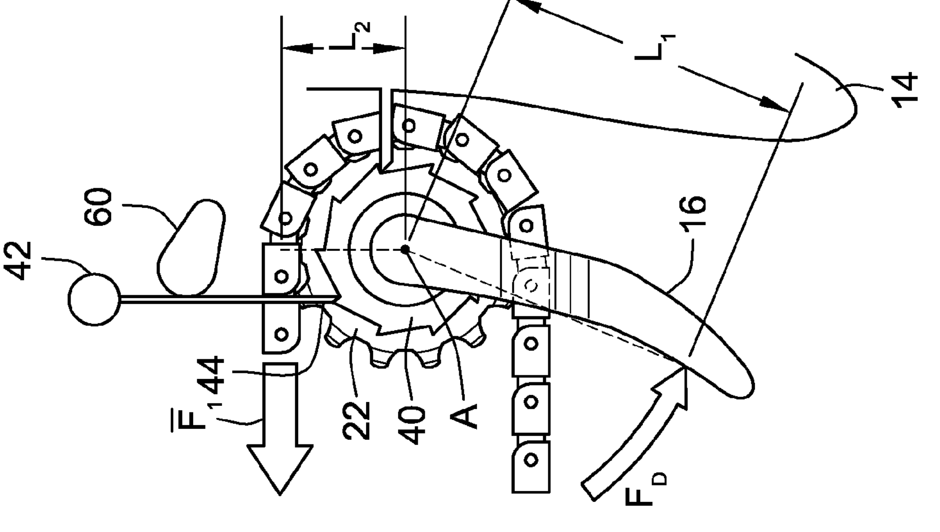

As shown in FIG. 5A, the bottom end 44 of the locking pawl 42 follows teeth on the gear 40 and permits the gear 40 and sprocket 22 to rotate in only one direction, i.e., counterclockwise in FIG. 4 and "away" from the bottom end 44 of the locking pawl 42. The locking pawl 42 is disengaged from the gear 40 by moving the bottom end 44 of the locking pawl 42 away from the gear 40, far enough to allow the bottom end 44 to clear the teeth of the gear 40 and to allow the gear 40 to reverse direction, i.e., rotate clockwise as shown in FIG. 4, counterclockwise as shown in FIG. 3. Rotating the gear 40 and sprocket 22 in a reverse or backward direction retracts the first portion of the push chain 24 from the cylinder 12 and allows the second portion of the push chain to be pulled into the magazine 32 by the push chain return spring 34.

The locking pawl 42 shown in FIG. 4, and its bottom end 44, can be disengaged from the gear 40 by rotating a cam shaft 60 that extends out of the sides of the handle 14. The cam shaft 60 shown in the figure is thus configured to push the bottom end 44 away from the gear 40, if the cam shaft 60 is rotated clockwise or counterclockwise. In an alternate embodiment, a ratchet disengagement mechanism is comprised of a shaft that extends orthogonally out from at least one side of the handle 14. A central part of the shaft inside the handle 14 has an outer diameter that is tapered such that when the shaft is depressed toward or into the handle 14, the taper on the shaft urges the locking pawl 42 sideways, just as the cam 60 would do, and away from the gear 40.

In FIG. 5A, a directed arrow at the bottom of the trigger 16 corresponds to a force $F_0$ exerted on the trigger 16 when a user squeezes the trigger 16 toward or into the handle 14. The force $F_0$ creates a counterclockwise (as shown in FIG. 4; clockwise in FIG. 3) torque on the sprocket 22. The torque created by $F_0$ compresses the trigger return spring 18 at the same time that it urges the sprocket 22 counterclockwise (in FIG. 4). Urging the sprocket 22 counterclockwise impresses a force $F_1$ on the back side 25 of the piston 26. The force $F_1$ exerted on the first part of the chain 24 is thus compressive. The force $F_1$ is applied in a substantially straight line, essentially down, or along, the central axis of the cylinder 12.

In FIG. 5A the directed arrow at the bottom of the trigger 16 depicts a force of magnitude $F_0$ applied to the trigger 16 at a distance $L_1$ from the center of the sprocket 18. That $$\Gamma_1 = F_0 \times L_1$$

Driving the sprocket 22 counterclockwise (as shown in the figures) by squeezing the trigger 16 thus creates a reaction force $F_1$ in the push chain 24, which is exerted on the piston 26. The reaction force $F_1$ can be calculated by assuming that just before the chain moves in response to squeezing the trigger, the sum of the moments around the axis of the sprocket is zero. The force $F_1$ on the chain 20 will therefore be equal to:

$$F_1 = \frac{F_0 \times L_1}{L_2}$$

Since $L_2$ is smaller than $L_1$, the quotient of $L_1$ to $L_2$ will be greater than one. The magnitude of the force $F_1$ exerted on the chain 20 (and hence the piston 21 and extrudable material in a canister) by the force $F_0$ will therefore be proportionately greater than the force $F_0$ exerted by a user on the trigger 16, however, the horizontal or lateral displacement of the chain 24 by the actuation of the trigger 16 will be less than the lateral displacement of the trigger 16. Stated another way, the torque multiplication provided by the longer moment arm $L_1$ vis-à-vis $L_2$, multiplies the force $F_1$ applied to the chain 24, to the piston 26 and to extrudable material 23 in a canister 21 within the dispenser 10 but at a "cost" of a reduced horizontal displacement of the chain 24 in the cylinder 21. The ratio of the length of the torque arms $L_1$ and $L_2$ can thus effectuate both a torque/force multiplication as well as a division of the horizontal displacement. Stated another way, the length of the trigger 16 and the diameter of the sprocket 24 can be selected such that a full actuation of the trigger 16 dispenses a fixed or substantially fixed amount of extrudable material 23 from the canister 21. The dispenser 10 can therefore dispense fixed amounts of extrudable material by the full actuation of the trigger 16.

A "full actuation" of the trigger 16 is considered herein to be the rotation of the trigger 16 about its pivot point P, to a point where the locking pawl 42 can engage the next notch in the gear 40. The number of notches or teeth on the gear 40 and the length of the trigger 16 thus effectively determine the angle through which the trigger 16 can be rotated and thus determine the maximum amount of material that can be dispensed with each trigger actuation.

FIG. 5B depicts the trigger 16 at the end of its travel around the axis of the sprocket 22. Additional counterclockwise rotation of the sprocket 22 effectuates additional lateral translation of the push chain 24 toward the left-side of the figure, as well as additional compressive force on the chain 24.

In FIG. 5C, the trigger 16 is released. The trigger return spring (not shown in FIGS. 5A-5C) causes the trigger 16 to return to its starting location and reduces the compressive force on the chain 24. In most embodiments, however, a ratchet mechanism holds the sprocket 22 and chain 24 in place, i.e., does not allow the sprocket to reverse direction.

Figure 6B:
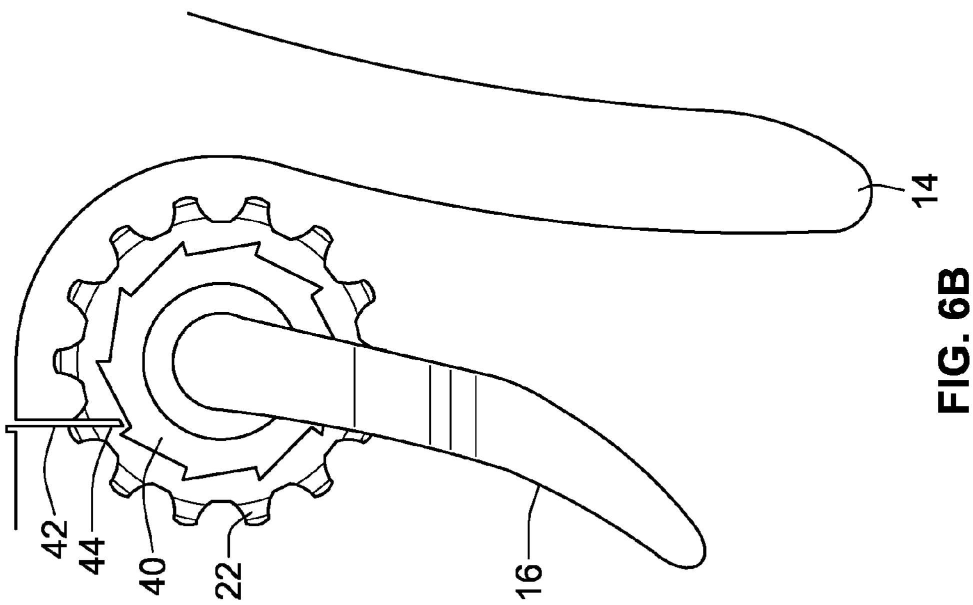
FIGS. 6A and 6B are isolated views of a ratchet mechanism.
Figure 6A:
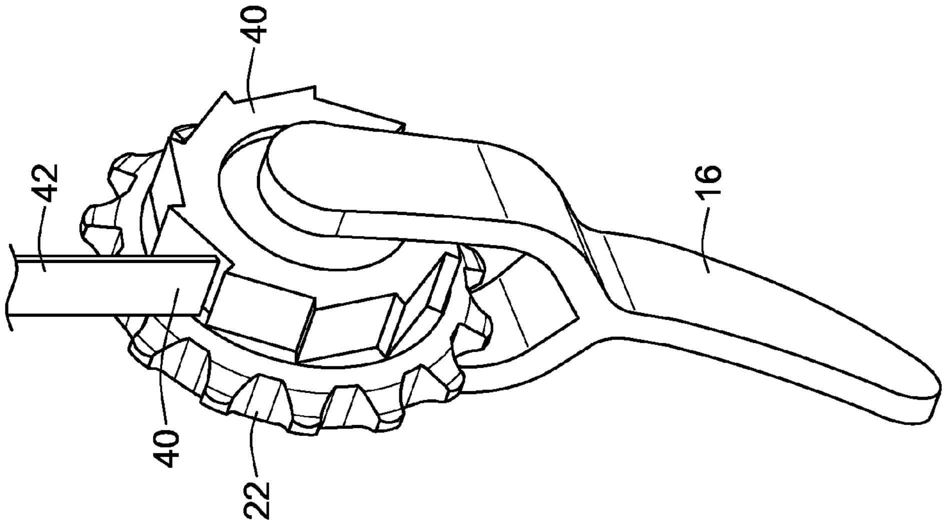

FIGS. 6A and 6B are enlarged, isolated views of the releasable ratchet mechanism depicted in FIG. 5A. In these views, the gear 40 is more clearly seen as being permitted to rotate in only one direction until the bottom end 44 of the locking pawl 42 is moved out of engagement with the gear 40.

FIG. 7 is an end view as seen from the handle/housing 14, which is cut away to show the interior portions of the handle/housing 14. The sprocket 22 can be seen mounted to and rotating on a one-way bearing 66, the opposite ends of which are supported by the handle/housing 14. The push chain 24 can be seen riding over the sprocket 22.

Those of ordinary skill and in mechanical arts will appreciate from the foregoing figures and description that actuation of the trigger 16 around its pivot point P, causes the sprocket 22 to rotate through an angle of rotation around the sprocket's central axis A. The size of the angle of rotation is determined by the length of the moment arm $L_1$ and the angle through which the trigger 16 can rotate about its pivot point. Since the sprocket 22 is provided with a fixed number of teeth that can engage corresponding links of the chain, rotation of the sprocket by the complete actuation of the trigger causes the piston to move down the cylinder 12 by a fixed and identical distance on each actuation of the trigger. The trigger and its angular actuation thus becomes a measurement device. By controlling the angle through which the trigger rotates, it is therefore possible to control the amount of extrudable material dispensed.

For purposes of claim construction, the push chain 24 is considered herein to be a linear actuator, in the sense that it is capable of exerting a compressive force in a substantially straight line without buckling. In a preferred embodiment, the push chain is stored in a magazine shown in the figures as being parallel to and attached alongside the cylinder 12. In an alternate embodiment, the push chain 20 can also be stored into the handle as those of ordinary skill in the art will recognize.

The cylinder, handle, trigger and push chain can be fabricated from metal, plastic or carbon fiber. While the return springs 34 and 50 are preferably metal, an elastic band can be substituted for the return spring 34 or 50.

The foregoing description is for purposes of illustration only. The true scope of the invention is defined by the appurtenant claims.

What is claimed is:

1. A rodless dispenser for dispensing an extrudable material, the rodless dispenser comprising:

a cylinder having first and second ends and configured to hold a tube containing extrudable material;

a piston within the cylinder;

a housing attached to the cylinder;

a handle attached to the housing and said cylinder proximate the first end of the cylinder;

a reciprocating trigger attached to at least one of: the housing and the handle;

a chain sprocket inside the housing, and mounted to and capable of rotating on a one-way bearing that is inside the sprocket and supported by the housing, the one-way bearing rotating in only a first direction around an axis, the sprocket being operatively coupled to the trigger such that actuation of the trigger rotates the sprocket around the axis through a first angle in a second direction of rotation, the second direction being opposite the first direction;

a push chain having first and second ends, the push chain being wrapped part way around the sprocket and extending into the cylinder, the push chain first end being coupled to the piston such that sprocket rotation in the second direction causes the push chain to push the piston toward the second end of the cylinder, the second end of the chain being located inside a push chain magazine such that sprocket rotation in the second direction causes the push chain second end in the magazine to move in said magazine toward said second end of the cylinder.

2. The rodless dispenser of claim 1, further including a ratchet mechanism coupled to the sprocket, the ratchet mechanism controllably allowing the sprocket to rotate in one of the first direction and the second direction.

3. The rodless dispenser of claim 2, further including a ratchet release coupled to the ratchet mechanism, the ratchet release disabling the ratchet mechanism to allow the sprocket to rotate in the second direction.

4. The rodless dispenser of claim 1, wherein said chain is at least one of:

plastic;

carbon fiber; and metal.

5. The rodless dispenser of claim 1, further comprised of a return spring.

6. The rodless dispenser of claim 5, wherein the return spring is configured to exert a compressive force on a portion of the chain located between the sprocket and piston.

7. The rodless dispenser of claim 5, wherein the return spring is configured to exert a tensile force on a portion of the chain located between the sprocket and a distal end of the chain magazine.

8. The rodless dispenser of claim 1, wherein the cylinder and magazine central are adjacent to each other.

9. The rodless dispenser of claim 1, wherein the cylinder and magazine have geometric axes that are substantially parallel to each other.

10. The rodless dispenser of claim 1, wherein said cylinder is configured to receive a canister containing extrudable material.

11. The rodless dispenser of claim 1, wherein said sprocket is provided with a gear and wherein a fixed angle of rotation of the sprocket is determined by the number of teeth on said gear.

12. The rodless dispenser of claim 11 wherein the trigger has first and second ends and wherein said first end of said trigger, the sprocket and the gear are fixed together such that actuation of the trigger causes the sprocket and gear to rotate through the same angle.

13. The rodless dispenser of claim 11, further comprised of a releasable latch that engages said teeth on said gear, release of said releasable latch allowing the sprocket to be rotated to allow the piston to be retracted in said cylinder and said chain to be stored in said magazine.

14. The rodless dispenser of claim 1, further comprising a trigger return spring operatively coupled to said handle and said trigger.

15. The rodless dispenser of claim 1, further comprised of a tube of edible foodstuff inside said cylinder.

16. The rodless dispenser of claim 1, further comprised of a tube of sealant inside said cylinder.

17. A method of dispensing extrudable material from a dispenser using a push chain having first and second ends and which is configured to exert a substantially linear and compressive force against a piston, the first end of the push chain being against the piston, the second end being in a storage magazine for the push chain, the push chain being wrapped part way around a sprocket mounted to and rotating on a one-way bearing supported by a housing coupled to the storage magazine, the sprocket being capable of selectively rotating in two directions about an axis responsive to the one-way bearing, configured to be able to rotate in only a first direction, the one-way bearing being located in the sprocket and attached to a reciprocating handle, the one-way bearing and reciprocating handle comprising a ratchet release mechanism, the method comprising the steps of:

rotating the sprocket around the axis through a first angle, in a second rotational direction, which is opposite the first direction, the sprocket being rotated by actuating the reciprocating handle in the second direction, to thereby urge the first end of the push chain in a first, substantially linear direction toward the piston thereby subjecting a first part of the push chain between the sprocket and piston to a compressive force.

18. The method of claim 17, including the step of actuating a trigger coupled to the sprocket to cause the sprocket to rotate through a first, substantially fixed angle.

19. The method of claim 18, wherein the step of urging the first end of the push chain in a first, substantially linear direction includes the step of urging the piston away from the sprocket and part way through a cylinder holding extrudable material in response to the sprocket rotation.

20. The method of claim 19, wherein the step of urging the piston away from the sprocket includes the step of dispensing extrudable material from the cylinder, responsive to the sprocket rotation.

21. The method of claim 17, further comprised of the step of:

subjecting the second end of the chain to a tensile force.

22. The method of claim 17, further comprising the step of selectively preventing the sprocket from rotating in the second direction.

23. The method of claim 22, further including the step of enabling the sprocket to rotate in the second direction upon the actuation of a release mechanism operatively coupled to the sprocket.

* * * * *